United States Patent [19]

Richardson, III

[11] 4,162,098
[45] Jul. 24, 1979

[54] PROTECTIVE LINER FOR PICKUP TRUCKS

[76] Inventor: Sam M. Richardson, III, P.O. Box 1582, El Dorado, Ark. 71730

[21] Appl. No.: 806,097

[22] Filed: Jun. 13, 1977

[51] Int. Cl.² .............................................. B62D 33/00
[52] U.S. Cl. .................................. 296/39 R; 220/470; 224/42.42 R
[58] Field of Search ............. 220/63 R; 296/57, 39 R; 224/42.42 R

[56] References Cited

U.S. PATENT DOCUMENTS

| | | | |
|---|---|---|---|
| 3,814,473 | 6/1974 | Lorenzen | 296/39 R |
| 3,881,768 | 5/1975 | Nix | 296/39 R |
| 4,047,749 | 9/1977 | Lambitz et al. | 296/39 R |

Primary Examiner—Richard A. Bertsch
Attorney, Agent, or Firm—Diller, Ramik & Wight

[57] ABSTRACT

This disclosure relates to a protective liner for the bed of a pickup truck formed as a one-piece plastic member having transverse and longitudinal edge portions with the longitudinal edge portions being notched to accommodate wheel wells of the pickup truck bed, a plurality of general parallel lands and valleys disposed longitudinally of the member, and upstanding sidewalls bordering one of the transverse edge portions and both of the longitudinal edge portions, and the sidewall merging with an outwardly directed terminal bordering wall adapted to be contiguously disposed relative to an inner body wall of the pickup truck bed.

12 Claims, 6 Drawing Figures

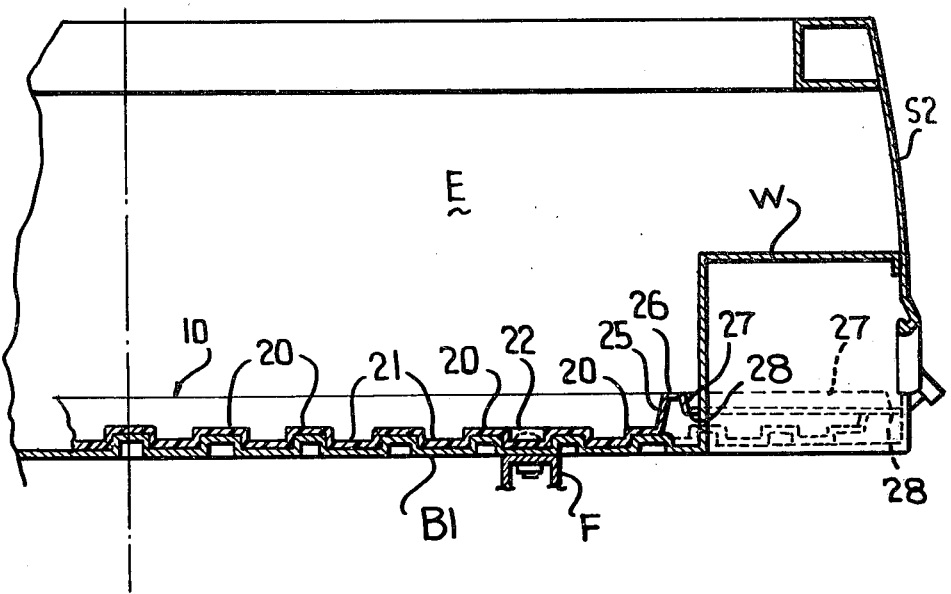
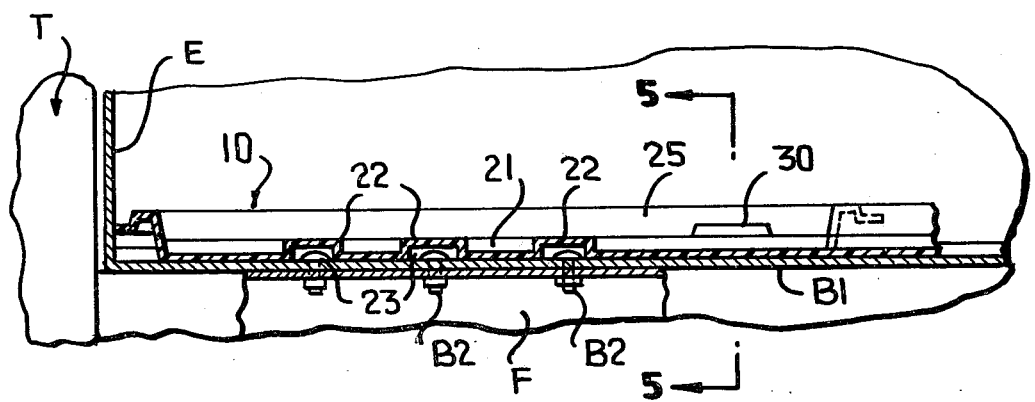
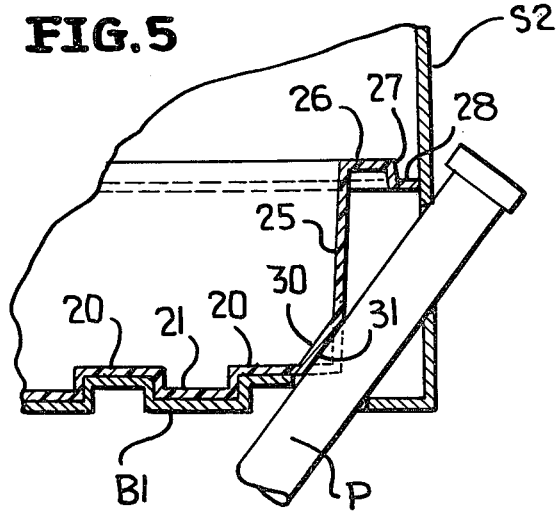
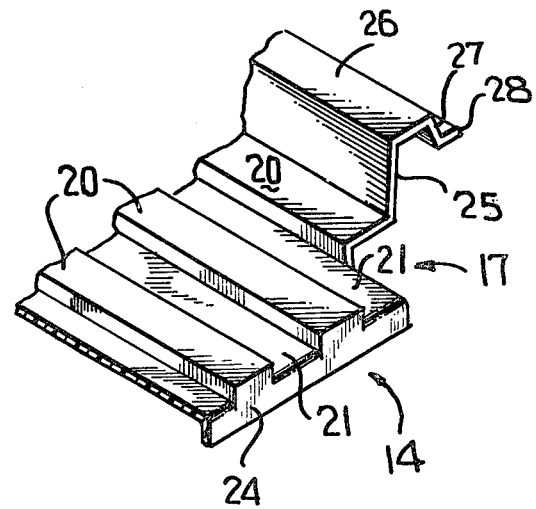

PROTECTIVE LINER FOR PICKUP TRUCKS

This invention is directed to a novel protective liner for a pickup truck bed which can be readily positioned thereinto and removed therefrom in order to protect the truck bed or truck box from becoming marred, dented, worn, torn or otherwise adversely affected through normal use, abnormal abuse, corrosive materials, or the like. The liner is preferably constructed from high-density polyethylene by conventional vacuum forming techniques and is sized to intimately conform to the innermost sidewall of the pickup truck bed or box, and due to the latter fastening devices are unnecessary to retain the liner in a relatively fixed position relative to the pickup truck bed.

In keeping with the foregoing, an object of this invention is to provide a novel protective liner for pickup truck beds formed as a one-piece plastic member having a pair of opposite longitudinal and transverse edge portions with the longitudinal edge portions having notches opening in opposite transverse directions to receive wheel wells of the pickup truck bed, a plurality of general parallel lands and valleys disposed longitudinally of the member, a short upstanding sidewall bordering one of the transverse edge portions and the pair of longitudinal edge portions, the sidewall merging with an outwardly directed terminal bordering wall adapted to be contiguously disposed relative to an inner body wall of the pickup truck bed, and a notch at each of two corners of the member defined by terminal ends of the pair of longitudinal edge portions and a second of the transverse edge portions to accommodate corner walls of the pickup truck bed.

Still another object of this invention is to provide a novel protective liner of the type aforesaid wherein the second transverse edge portion includes a short downwardly directed edge which precludes water, dirt and the like from entering between the liner and a floor of the pickup truck bed.

Yet another object of this invention is to provide a novel protective liner of the type heretofore defined wherein at least two of the valleys each have a downwardly opening relieved area adapted to accommodate the head of a bolt or like fastener which secures the pickup truck bed to an associated truck frame thereby assuring that the liner remains flat and in conformity with the bottom of the pickup truck bed.

Still another object of this invention is to provide a novel protective liner of the type set forth hereinbefore wherein the sidewall along at least one of the longitudinal edge portions has an inclined wall portion defining a generally downwardly and outwardly opening recess adapted to accommodate a gasoline filler pipe.

Another object of this invention is provide a novel protective liner of the type set forth herein wherein the liner is symmetrical about a longitudinal center line thereof.

With the above, and other objects in view that will hereinafter appear, the nature of the invention will be more clearly understood by reference to the following detailed description, the appended claims and the several views illustrated in the accompanying drawing.

In the drawings:

FIG. 3 is an enlarged fragmentary sectional view taken generally along line 3—3 of FIG. 1, and illustrates the manner in which a terminal bordering wall or edge of the liner is in intimate contiguous relationship with the wheel well and sidewall of the truck bed.

FIG. 4 is an enlarged fragmentary sectional view taken generally along line 4—4 of FIG. 1, and illustrates raised portions which define downwardly opening relieved areas in valleys of the protective liner for accommodating the heads of bolts or like fasteners.

FIG. 5 is a fragmentary sectional view taken generally along line 5—5 of FIG. 4, and illustrates an inclined wall defining a generally downwardly and outwardly opening recess to accommodate a gasoline filling pipe.

FIG. 6 is a fragmentary perspective view of a corner of the protective liner, and illustrates a notch or cut-out for accommodating a corner wall of the pickup truck bed.

Figure 1:
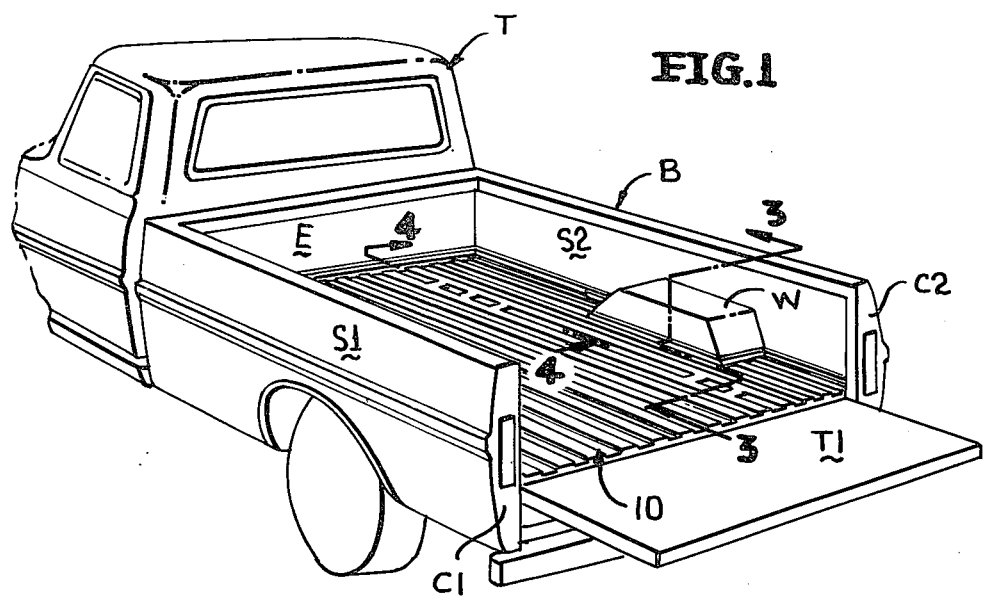
FIG. 1 is a fragmentary perspective view of a pickup truck, and illustrates the protective liner of this invention positioned within a truck bed or cargo box.

A pickup truck T (FIG. 1) includes a conventional bed or cargo box B defined by an end wall E, sidewalls S-1, S-2, corner walls C-1, C-2, and a tailgate T-1. Within the interior of the bed B and defining part of the same are a pair of wheel wells (only one which is shown) and a bottom B-1 (FIG. 4).

Within the pickup truck bed B is a novel one-piece protective liner constructed in accordance with this invention which is generally designated by the reference numeral 10. The liner 10 is preferably vacuum formed by conventional techniques and is formed of high strength poylethylene or like plastic material.

The protective liner 10 includes a pair of oppositely disposed longitudinal edge portions 11, 12 (FIG. 2) and a pair of oppositely disposed transverse edge portions 13, 14. The liner or member 10 along the longitudinal edge portions 11, 12 is provided with notches or relieved areas 15, 16 for accommodating the wheel wells W in the manner best illustrated in FIG. 1. Also, at terminal end portions (unnumbered) of the longitudinal edge portions 11, 12 and the transverse edge portion 14 are cut-outs or notches 17, 18 of a generally rectangular configuration to accommodate the corner walls C-1, C-2 (FIG. 1).

Running longitudinally of the liner 10 are a plurality of lands 20 and valleys 21 (FIG. 3) which are in alternating relationship and generally run the length of the liner 10 between the transverse edge portions 13, 14 except in the areas interrupted by the notches 15, 16. The lands and valleys 20, 21, respectively, mesh with or interfit with lands and valleys of the bottom B-1 in the manner best illustrated in FIG. 3. Moreover, several of the valleys 21 have raised portions 22 (FIGS. 2 and 4) defining downwardly opening relieved areas or gaps 23 which accommodate the heads of bolts or like fasteners B-2 which connect the pickup truck bed B to a frame F of the vehicle (unnumbered) or may be utilized for securing to the frame F tool boxes or like auxiliary equipment. Due to the relieved areas 23 the liner 10 rests essentially as flush as possible upon the bottom B-1 of the truck bed B.

The transverse edge portion 14 includes a downwardly directed relatively short wall 24 (FIGS. 2 and 6) which functions as a lip overlying the endmost edge (not shown) of the bottom wall B-1 and thus directs water, debris or the like to fall in a downward direction and the latter cannot be entrapped between the liner 10 and the bottom B-1.

The longitudinal edge portions 11, 12 and the transverse edge portion 13 include a short upwardly directed and slightly inclined sidewall 25 which merges with a generally horizontally disposed wall 26 which in turn merges with a downwardly directed inclined wall 27 and an outwardly directed terminal border wall 28 (FIG. 6). The edge (unnumbered) of the border wall 28 is disposed as contiguously as possible against or with minimal spacing from the end wall E, the internal walls of the sidewalls S-1, S-2, and the surfaces defining the wheel wells W to again assure that debris, dirt, and the like will not enter into an area between the liner 10 and portions of the truck bed B covered thereby.

The sidewall 25 includes at two portions thereof along the longitudinal edge portions 11, 12 inclined walls 30 (FIGS. 2 and 5) which define generally downwardly and outwardly opening recesses for receiving a gasoline filler pipe P in the manner illustrated in FIG. 5. The inclined walls 30 are disposed adjacent each of the longitudinal edge portions 11, 12 so that the liner 10 can be utilized with trucks T having their gasoline filling or filler pipes P positioned adjacent either the sidewall S-1 or the sidewall S-2.

Figure 2:
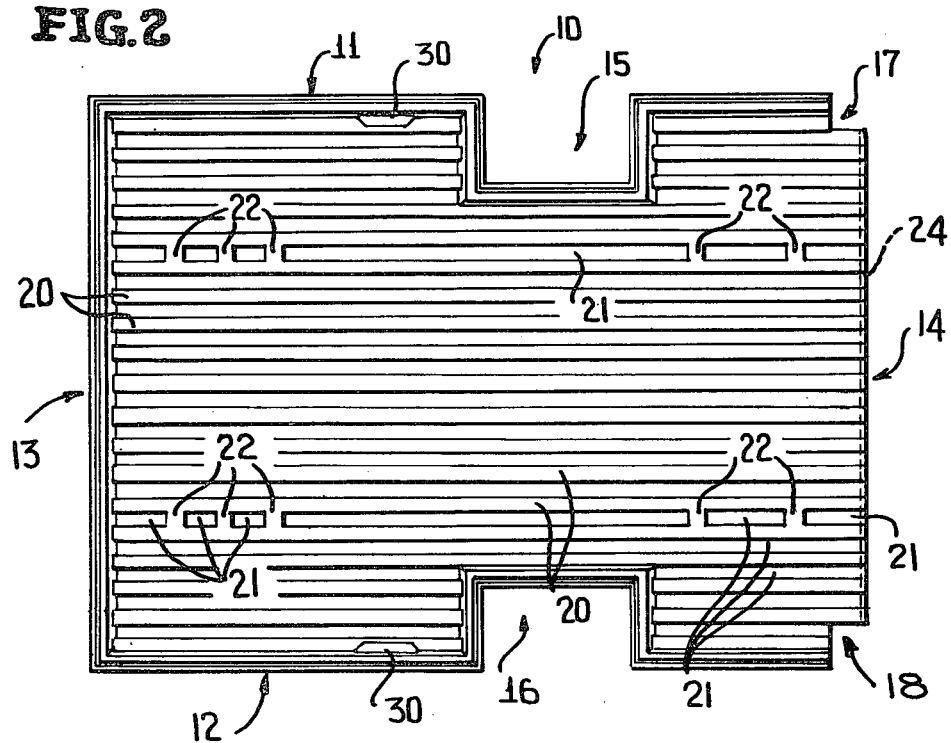
FIG. 2 is a top-plan view of the protective liner of this invention, and illustrates the overall symmetrical shape thereof, along with longitudinally disposed lands and valleys, notches for accommodating wheel wells, and corner notches for accommodating corner walls of a pickup truck bed.

It is also to be noted from FIG. 2 that the liner 10 is symmetrical relative to its longitudinal axis.

Although in a preferred embodiment of the invention as has been specifically illustrated and described herein, it is to be understood that minor variations may be made protective liner for pickup trucks without departing from the spirit and scope of the invention, as defined in the appended claims.

It is claimed:

1. A protective liner for a pickup truck bed comprising a one-piece plastic member having a pair of opposite longitudinal edge portions and a pair of opposite transverse edge portions, said longitudinal edge portions having relieved areas adapted to receive wheel wells of the pickup truck bed, a plurality of generally parallel upwardly projecting lands and upwardly opening valleys disposed longitudinally of said member, a first short upstanding sidewall bordering one of said transverse edge portions, second and third short upstanding sidewalls bordering said longitudinal edge portions, said first through third sidewalls merging with respective first through third terminal bordering edges adapted to be contiguously disposed relative to an inner body wall of the pickup truck bed, each of said bordering edges being defined by a first horizontal wall merging with each short upstanding sidewall, a downwardly directed wall merging with each first horizontal wall, and an outwardly directed second horizontal terminal wall merging with each downwardly directed wall.

2. The protective liner as defined in claim 1 including a relieved area at each of two corners of said member defined by terminal ends of said pair of longitudinal edge portions and a second of said transverse edge portions, and an unrelieved portion of a second of said transverse edge portions being disposed between and spacing said relieved areas from each other.

3. The protective liner as defined in claim 2 including a short downwardly directed edge bordering said second transverse edge portion.

4. The protective liner as defined in claim 2 wherein at least two of said valleys each have a downwardly opening relieved area adapted to accommodate the head of a bolt or like fastener for securing the pickup truck bed to an associated truck frame.

5. The protective liner as defined in claim 2 wherein said member includes a longitudinal centerline, and said lands and valleys are symmetrically disposed on opposite sides of said longitudinal centerline.

6. The protective liner as defined in claim 1 including a short downwardly directed edge bordering a second of said transverse edge portions.

7. The protective liner as defined in claim 1 wherein at least two of said valleys each have a downwardly opening relieved area adapted to accommodate the head of a bolt or like fastener for securing the pickup truck bed to an associated truck frame.

8. The protective liner as defined in claim 1 wherein said member includes a longitudinal centerline, and said lands and valleys are symmetrically disposed on opposite sides of said longitudinal centerline.

9. The protective liner as defined in claim 1 wherein said member includes a longitudinal centerline, and opposite sides of said member relative to said longitudinal centerline are symmetrical.

10. The protective liner as defined in claim 1 including an inclined wall portion disposed between a land most adjacent one of said second and third short upstanding sidewalls defining a generally downwardly and outwardly opening recess adapted to receive a gasoline filler pipe.

11. A protective liner for a pickup truck bed comprising a one-piece plastic member having a pair of opposite longitudinal edge portions and a pair of opposite transverse edge portions, said longitudinal edge portions having oppositely transversely opening notches opening in opposite transverse directions to receive wheel wells of the pickup truck bed, a plurality of generally parallel upwardly projecting lands and upwardly opening valleys disposed longitudinally of said member, a short upstanding sidewall bordering one of said transverse edge portions and said pair of longitudinal edge portions, said sidewall merging with an outwardly directed terminal bordering wall adapted to be contiguously disposed relative to an inner body wall of the pickup truck bed, a notch at each of two corners of said member defined by terminal ends of said pair of longitudinal edge portions and a second of said transverse edge portions, said notches being spaced from each other by a remaining portion of said second transverse edge portion disposed therebetween, a short downwardly directed edge bordering said second transverse edge portion, at least two of said valleys each having a downwardly opening relieved area adapted to accommodate the head of a bolt or like fastener for securing the pickup truck bed to an associated truck frame, and said sidewall along at least one of said longitudinal edge portions having an inclined wall portion defining a generally downwardly and outwardly opening recess adapted to receive a gasoline filler pipe.

12. The protective liner as defined in claim 11 wherein said outwardly directed terminal bordering wall is defined by a first horizontal wall merging with each of said bordering edges being defined by a first horizontal wall merging with each short upstanding sidewall, a downwardly directed wall merging with each first horizontal wall, and an outwardly directed second horizontal terminal wall merging with each downwardly directed wall.

* * * * *